J. F. BELLEMERE & F. R. FLEER.
Sleeves or Patches for Stopping Leaks in Hose.
No. 141,536. Patented August 5, 1873.
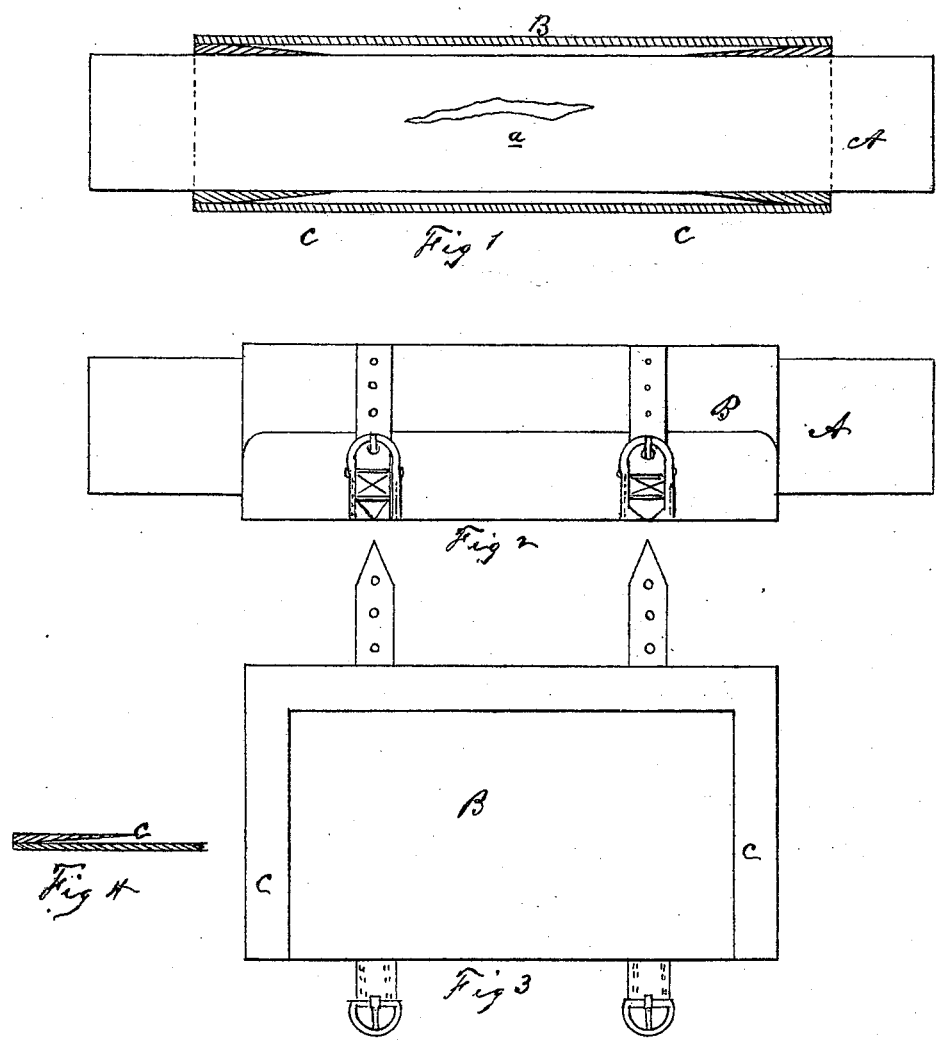

UNITED STATES PATENT OFFICE.

JOHN F. BELLEMERE AND FRANCIS R. FLEER, OF READING, PENNSYLVANIA.

IMPROVEMENT IN SLEEVES OR PATCHES FOR STOPPING LEAKS IN HOSE.

Specification forming part of Letters Patent No. 141,536, dated August 5, 1873; application filed July 7, 1873.

*To all whom it may concern:*

Be it known that we, JOHN F. BELLEMERE and FRANCIS R. FLEER, of Reading, in the county of Berks and State of Pennsylvania, have invented certain new and useful Improvements in Sleeves or Patches for Mending Hose or Stopping Leaks therein; and we do hereby declare the following to be a full, clear, and exact description of the invention, such as will enable others skilled in the art to which it pertains to make and use it, reference being had to the accompanying drawings, which form part of this specification, in which—

Figure 1 is a sectional view of the sleeve applied. Fig. 2 is a side view or elevation of the patch. Fig. 3 is a plan view of the patch. Fig. 4 is a section of the patch.

The object of our invention is to provide means for speedily and effectually stopping leaks in pipes and hose. Our invention consists of a sleeve or patch which, when the hose or pipe leaks from a rupture or other cause, may be slided or placed over the opening, as hereinafter described.

Referring to the accompanying drawing, A shows a section of hose, in which $a$ is an opening caused by accident or defective construction. B is the device for preventing the escape of the water through this opening, consisting of a sleeve which surrounds the hose, as shown. C is an annular lip or flap on the inside of each end of the sleeve. The lip C is beveled, as shown, so as to have less thickness at its inner than at its outer edge. The outer edge of the lip or flap is firmly secured by any suitable means, as rivets, to the sleeve, so as to form a water-tight joint.

In Fig. 2 is shown a modification, consisting of a patch formed, as is the sleeve, with beveled flaps at each end.

The operation is as follows: In case of a break in the hose or pipe, or, in other words, if the hose or pipe should burst, as is often the case, slip the sleeve over the break or fold the patch over the hole, fastening the patch with buckles, or in any convenient and suitable manner, thereby effectually preventing the escape of water from the bursted part.

The principle is as follows: The water escaping from the hole in the hose or pipe forces itself between the sleeve or patch and the lips or flaps at the end, thereby pressing said flaps against the periphery of the hose, forming a joint.

The sleeve or patch may be made of any suitable material, as India rubber or leather.

What we claim as our invention is—

1. The sleeve or patch B, having the internal lips or flaps C so arranged that when the patch is applied to a hose said flaps shall encircle the same and make a water-tight joint when subjected to pressure from the inside, substantially as described.

2. The hose-patch consisting of the tube B, made of leather or other flexible material, and provided with the internal lips or flaps C, arranged substantially as shown and described.

In testimony that we claim the foregoing we have hereunto set our hands this 1st day of July, 1873.

JOHN F. BELLEMERE.
FRANCIS R. FLEER.

Witnesses:
WASHINGTON RICHARDS,
D. D. MAUREER.